(12) United States Patent
Ait Bouziad et al.

(10) Patent No.: US 10,258,190 B2
(45) Date of Patent: Apr. 16, 2019

(54) FOOD OR BEVERAGE PREPARATION MACHINE WITH DETACHABLE BREWING UNIT

(71) Applicant: NESTEC S.A., Vevey (CH)

(72) Inventors: Youcef Ait Bouziad, Echandes (CH);
Fabien Ludovic Agon, Blonay (CH);
Alexandre Perentes, Lausanne (CH);
Alfred Yoakim, St-legier-la Chiesaz (CH); Philippe Dumur, Serraval (FR)

(73) Assignee: Nestec S.A., Vevey (CH)

( * ) Notice: Subject to any disclaimer, the term of this patent is extended or adjusted under 35 U.S.C. 154(b) by 528 days.

(21) Appl. No.: 14/912,110

(22) PCT Filed: Aug. 8, 2014

(86) PCT No.: PCT/EP2014/067065
§ 371 (c)(1),
(2) Date: Feb. 15, 2016

(87) PCT Pub. No.: WO2015/024798
PCT Pub. Date: Feb. 26, 2015

(65) Prior Publication Data
US 2016/0192807 A1 Jul. 7, 2016

(30) Foreign Application Priority Data
Aug. 22, 2013 (EP) ..................................... 13181420

(51) Int. Cl.
A47J 31/44 (2006.01)
A47J 31/06 (2006.01)

(52) U.S. Cl.
CPC ......... *A47J 31/446* (2013.01); *A47J 31/0668* (2013.01); *A47J 31/4403* (2013.01)

(58) Field of Classification Search
CPC .. A47J 31/446–31/4471; A47J 31/0668; A47J 31/4403
(Continued)

(56) References Cited

U.S. PATENT DOCUMENTS

| 5,870,943 | A | * | 2/1999 | Levi | .................... | A47J 31/0647 |
| | | | | | | 99/287 |
| 2011/0177205 | A1 | * | 7/2011 | Bardazzi | ............. | A47J 31/0668 |
| | | | | | | 426/77 |

FOREIGN PATENT DOCUMENTS

| EP | 1688072 | 8/2006 |
| EP | 2612579 | 7/2013 |

(Continued)

*Primary Examiner* — Ibrahime A Abraham
*Assistant Examiner* — John J Norton
(74) *Attorney, Agent, or Firm* — K&L Gates LLP

(57) ABSTRACT

The invention concerns a food or beverage preparation machine (1) for preparing a flowable food product or a beverage by mixing a fluid with a precursor ingredient, said machine comprising:
  a base (2) having a fluid source, a pump means suitable for conducting said fluid from the source through fluid-conducting pipes to a fluid delivery port (9), and
  a functional element (3) detachable from the base (2), comprising connecting means (6, 7, 8) for connecting fluidly to the delivery port (9) of the base,
characterized in that said base (2) and said detachable functional element (3) both have cooperating magnetic attachment means such that the detachable element and the base can be removably connected with an attracting magnetic effect, and then disconnected by rotating said detachable element relative to said base with a repelling magnetic effect.

13 Claims, 7 Drawing Sheets

(58) Field of Classification Search
USPC .......................................................... 99/323
See application file for complete search history.

(56) References Cited

FOREIGN PATENT DOCUMENTS

| WO | 9627316 | 9/1996 |
| WO | 2010026529 | 3/2010 |

* cited by examiner

FOOD OR BEVERAGE PREPARATION MACHINE WITH DETACHABLE BREWING UNIT

CROSS REFERENCE TO RELATED APPLICATIONS

The present application is a National Stage of International Application No. PCT/EP2014/067065, filed on Aug. 8, 2014, which claims priority to European Patent Application No. 13181420.4, filed Aug. 22, 2013, the entire contents of which are being incorporated herein by reference.

FIELD OF THE INVENTION

The present invention concerns a food preparation machine, more precisely a beverage preparation machine comprising a functional element that is detachable from the main machine base.

BACKGROUND OF THE INVENTION

Food preparation systems are well known in the food science and consumer goods area. Such systems allow a consumer to prepare at home a given type of food, for instance a beverage such as a coffee-based beverage, e.g. an espresso or a brew-like coffee cup.

In the following description, the invention will be described in relation to a its specific application to beverage preparation systems. However, the invention globally encompasses systems for non-beverage items preparation, such as for instance ice cream, soups comprising particles (herbs, croutons, etc.), jellies, dairy items (e.g. yogurts, cream desserts, etc.), or any kind of similar non liquid flowable edible products.

Today, most preparation systems for in-home food and beverage preparation comprise a machine having a so-called "brewing chamber" or "brewing unit" which can accommodate portioned ingredient for the preparation of the food or beverage. A so-called "brewing unit" comprises several parts which are designed to be assembled so as to create a closed cavity wherein the food or beverage ingredient can be placed. The brewing unit comprises means for injecting a preparation medium under pressure such as a fluid which is typically water through the ingredient, so as to prepare a corresponding food or beverage, which is then dispensed out of the brewing unit, to the consumer. The preparation fluid is sourced from a fluid conducting system of the machine to which the brewing unit is connected. The preparation is performed within the brewing unit at a pressure above the atmospheric pressure, which is typically comprised between 1 and 20 bar, preferably between 2 and 15 bar (relative pressure). The preparation can be performed by passing preparation fluid through the ingredient in a loose form or through the ingredient contained in a capsule or pod. For this reason, it is an essential characteristic of a brewing unit to be able to withstand a pressure difference between inside the cavity, and the ambient pressure (which is generally equal or substantially equivalent to atmospheric pressure) without opening itself when pressure inside the cavity increases (typically fluid pressure, e.g. water pressure).

Ingredient portions can be pre-dosed before they are placed into the cavity of the brewing unit, and can take the form of soft pods or pads, or sachets. More and more systems utilize semi-rigid or rigid portions such as rigid pods or capsules. In the following, it will be considered that the beverage machine of the invention is a beverage preparation machine working with a rigid or semi-rigid capsule, or with an ingredient in loose form such as roast and ground coffee grains, to be placed directly into the brewing unit of the machine.

As said above, the so-called "brewing unit" of a machine comprises a receptacle or cavity for accommodating said ingredient, that is for instance contained in a capsule, and a fluid injection system for injecting a fluid, preferably water, under pressure through said ingredient, for instance by piercing through a wall of the capsule that contains the ingredient. Water injected under pressure through the ingredient, for the preparation of a coffee beverage according to the present invention, is preferably hot, that is to say at a temperature above 70° C. However, in some particular instances, it might also be at ambient temperature, or even chilled. The pressure inside the brewing unit during extraction and/or dissolution of the ingredient is typically about 3 to about 8 bar for dissolution products and about 2 to about 12 bar for extraction of roast and ground coffee.

By definition, the brewing unit comprises means to conduct fluid through the ingredient (e.g. fluid injection means such as for instance a needle), and a "closed cavity", that is to say a cavity that holds the ingredient within said brewing unit, such that said ingredient is not displaced out of said cavity under the effect of fluid passing there through, during the whole food or beverage preparation cycle, and until said ingredient is extracted or dissolved as a final food or beverage that is to be delivered to the consumer through a dispensing opening of said brewing unit. Preferably also, the so-called "closed" cavity of the brewing unit should ensure that no fluid injected therein escapes said brewing unit, except of course as final food or beverage that is to be delivered to the consumer.

In other words, a "brewing unit" comprises all functional elements necessary for holding the ingredient—be it loose, or contained in a capsule or pod—, and directing preparation fluid through and mixing it with said ingredient, during the preparation process and until final product delivery to the consumer. At all steps, the brewing unit resists the pressure difference between inside and outside of its cavity, such that:
 fluid can only flow from its entry point into the cavity, through the ingredient, towards the beverage dispensing opening of the cavity,
 and in case the ingredient is contained in a capsule or pod, the brewing unit encloses said capsule or pod so as to guarantee that fluid pressure increase therein does not damage the walls of said capsule or pod.

In food and beverage preparation systems known today, functional elements of the machine can be detached from the main machine body, so that the beverage preparation machine can be made modular and gives the possibility to the consumer to adapt one or the other functional element of the machine to its needs. For instance, it is possible to detach the brewing unit from the beverage machine base, so that it is easier to clean (the brewing unit is usually the functional part of the machine which is in contact with the ingredient or the beverage, and therefore it more likely to need regular maintenance and cleaning).

In other instances, the functional element of the machine that is detachable can be a serving container such as a cup. In this case, the cup can be connected to the main machine base so that a fluid can be directly dispensed from the machine to the cup, from the bottom of said cup. More precisely, the cup bottom part comprises a fluid valve means for establishing a fluid connection with the main machine base in a leak-tight manner. Once the cup is connected to the machine, the user can start a brewing cycle, and a beverage such as coffee for instance is produced within the machine main base, which is then pumped and filled through the fluid valve means into the cup, from below said cup (filling of the cup is done from below). When the cup is filled, the consumer can detach the cup from the main machine base and use it as a normal cup for drinking. Such a configuration is very appealing.

In yet other instances, the detachable functional element can be a water reservoir that needs to be plugged/unplugged from the main machine base, through a leaktight fluid communication port.

In all instances known today, when a beverage preparation machine comprises a detachable functional element (i.e. an element that is necessary to conduct the correct functioning of the machine from the ingredients to the dispensing of the finished product to the serving container), said machine comprises complex means to attach and detach the functional element from the main machine base. For instance, such means can involve, cams, levers, hooks, locks and other similar mechanical means. Such means are complex and therefore expensive to manufacture, and also they are somehow complex to use for the consumer as they require several handling steps to unlock, unscrew, etc. Last but not least, their complex construction is an obstacle to easy maintenance and cleaning, and some of them can be subject to breakage after a certain time, due to the wearing of the mechanical parts. This is of course undesirable to the consumer.

There is therefore a need for a flowable food, or beverage preparation machine that comprises at least one detachable functional element, that obviates the disadvantages of the known systems.

SUMMARY OF THE INVENTION

The objectives set out above are met with a food or beverage preparation machine for preparing a flowable food product or a beverage by mixing a fluid with a precursor ingredient, said machine comprising:
- a base having a fluid source, a pump means suitable for conducting said fluid from the source through fluid-conducting pipes to a fluid delivery port, and
- a functional element detachable from the base, comprising connecting means for connecting fluidly to the delivery port of the base, characterized in that said base and said detachable functional element both have cooperating magnetic releasable attachment means comprising:
  (i) at least one first permanent magnetic element attached to the detachable functional element or to the base, said first magnetic element being located on a wall surface that also comprises the connecting means, respectively the fluid delivery port, and
  (ii) at least two second magnetic elements attached to the base or, respectively, attached to the detachable functional element, said corresponding magnetic elements being located on a wall surface that also comprises the fluid connection port, respectively the connecting means, and one of said second magnetic elements having a permanent opposite polarity to that of the first magnetic element, so that:
  when the detachable element is fluidly and functionally connected to the base, magnetic elements of the detachable element and base in alignment have opposed polarities so as to be magnetically attracted so as to maintain a functional connection between the base and the detachable element of the machine, and then
  by rotating (or otherwise pivoting) the detachable element relative to the base, magnetic elements of said detachable element and base are brought in a new alignment where two aligned magnetic elements have the same polarities, such that said detachable element is repelled outwardly from the base, and both are consequently disconnected from one another.

By "alignment" it is meant that two magnetic elements are brought in sufficiently close vicinity from one another, to allow their respective magnetic fields to interact in a substantial manner, that is to say, so as to create a force between the two that allows to either:
  keep two elements of the machine attached together (in spite of the weight of those elements), or
  create a repelling effect between two elements of the machine that allows to disconnect both elements from one another.

Importantly in the field of the present invention, the magnetic elements are preferably permanent magnets, but can also be magnetic elements having an induced polarity, such as for instance ferrous materials, or any other suitable ferromagnetic material which becomes a magnet when subject to the influence of a magnetic field.

For simplification purposes, it will be considered in the rest of the present description that the magnetic elements are permanent magnets.

With such a configuration, the detachable functional element and the machine base are connected to one another by approaching them so that their respective rows of magnets are attracted. The magnetic attraction is sufficiently strong to attach said base and said detachable element, even during a brewing cycle is performed with the machine, i.e. even when a fluid under pressure is conducted from the base to the detachable element. Furthermore, it is also very easy and user-friendly to detach the detachable element from the base by rotating or similarly "twisting" said detachable element from the base around the fluid connection between the two which is used as a pivot point. By rotating the detachable element relative to the base, the magnets of said detachable element are brought in alignment with magnets of the base which have the same polarity, and as a result, said detachable element is repelled outwardly from the base, and both the detachable element and the base are consequently disconnected from one another.

In other words, the detachable element is functionally connected to the base by aligning their respective magnets having opposed polarities thereby using the magnetic attracting effect between said aligned magnets, and then, said detachable element and said machine base are disconnected by aligning their respective magnets having same polarities to cause a magnetic repelling effect.

Advantageously, said functional detachable element can be suitable for mixing said fluid with said ingredient, and/or can be suitable for dispensing the food or beverage to a serving container.

In a first possible embodiment of the invention, said functional detachable element is a detachable brewing unit comprising fluid injection means and at least two cavity parts able to assemble to create a closed cavity for enclosing said ingredient, such that said brewing unit can inject fluid through said ingredient under pressure for mixing with said ingredient.

In a second possible embodiment of the invention, said functional detachable element is a drinking cup, and wherein the connecting means of said cup have integrated valve means able to open when said cup is fluidly connected to the machine base, and close in a leaktight manner when said cup is detached from said base.

The magnets of the base, and the magnets of the detachable functional element, are preferably each placed at diametrically opposed locations relative to the fluid connection between said base and said detachable element.

In a highly preferred embodiment of the invention, the cooperating magnetic attachment means comprise:

(i) two rows of three magnets on a wall of the machine base, the two rows located in diametrically opposed locations relative to the fluid delivery port between the base and the detachable element, and (ii) two corresponding rows of three magnets on a wall of the detachable functional element, the two rows located in diametrically opposed locations relative to the fluid connection means between the base and said detachable element, such that each magnet of the base is aligned to a corresponding magnet of the detachable functional element when the functional element is fluidly and functionally connected to the base, and magnets in each alignment have opposite polarities.

In a preferred embodiment of this invention, the connection between the machine base and the detachable functional element is performed by insertion of a cylindrical channelled protrusion that protrudes from said base or from said detachable element, into a corresponding cylindrical recessed channelled port of the detachable element, or respectively into a corresponding cylindrical recessed channelled port of the base, such that said base and said detachable element can engage in a leaktight manner and yet be rotated around said connection.

In this way, the machine base and the detachable functional element—for instance a detachable brewing unit—are attached together with the help of magnets, such as the magnets are inversed to each other allowing:

fast connection when they are aligned (natural introduction of the capsule holder), and fast redirection to the lock position (natural position) when the magnets are not aligned, and a unique locked angular position (when all magnets are aligned by pairs having opposite polarities), and fast release when the capsule holder is rotated from its locked position around the longitudinal axis of the connection so as to bring in alignment magnets that have the same polarity.

Preferably, the ingredient is enclosed in a portioned container such as a sachet, a soft pad, a pod, or rigid or semi-rigid capsule.

Advantageously, the detachable functional element is a brewing unit (3) comprising locking means suitable for preventing disassembly of the cavity parts when fluid pressure within said cavity and/or said ingredient exceeds atmospheric pressure.

Also preferably, the fluid source is a fluid reservoir, or a withdrawal means able to withdraw said fluid from an external fluid source.

The machine base further preferably comprises an element suitable for heating and/or chilling said fluid.

The detachable brewing unit is designed to lock to the machine main base and detachable element, so as to resist a certain pressure level for the fluid that flows between the two. Preferably, such a pressure level is comprised between 0.1 and 30 bar preferably comprised between 1 and 20 bar (relative pressure to the atmospheric pressure).

The surface of the capsule holder is supposed to support the high level of forces (20 bar multiplied by the surface of the capsule membrane)

The connection between the machine and the capsule holder is supposed to support only a fraction of the effort (20 bar multiplied by the surface of the connection). For instance:

Connection surface: D=3 mm (section S=7 mm$^2$)

Maximum fluid pressure=20 bar

→Maximum force F exerted onto the fluid connection between the machine base and the detachable functional element (e.g. the detachable brewing unit): F=1.4 kg.

Last but not least, a general principle of the invention is that the magnets in the surfaces of the two elements to assemble (machine base and functional detachable element), are located such as to create a "Poka-Yoke" ("fool-proof") mechanism. A poka-yoke (based on Japanese term) is any mechanism in a product or device that helps an operator avoid ("yokeru") mistakes ("poka") while using the product or device. Its purpose is to eliminate product defects by preventing, correcting, or drawing attention to human errors as they occur, especially due to construction constraints of a device.

In the present case, the location of the magnets is such that the attraction of magnets in the base and in the detachable element automatically sets the detachable element in the appropriate position relative to the base to achieve a proper connection between the two.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

In the following, an exemplary embodiment of the invention will be described, wherein the detachable functional element is a brewing unit meant for connecting to the beverage preparation machine base. The connection of the brewing unit to said base, according to the invention, makes a whole functional beverage preparation machine.

Figure 1:
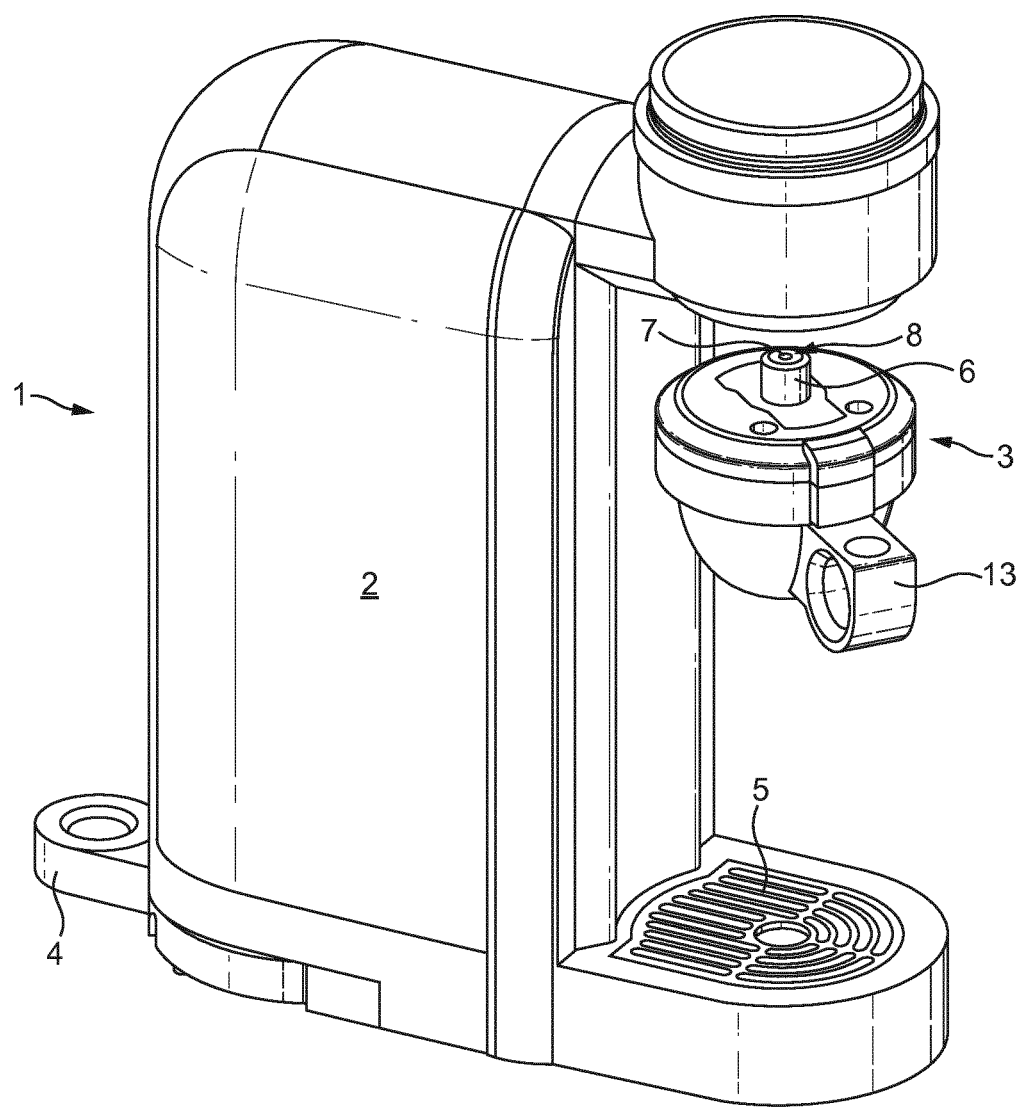
FIG. 1 is a perspective view of a machine according to the invention with the detachable brewing unit detached from the main machine base.

As illustrated in FIG. 1, the beverage preparation machine 1 comprises a main machine base 2, a detachable brewing unit 3, and an ingredient capsule (not shown in FIG. 1). The capsule is a closed capsule, made for instance of a thermoplastic, a metal, paper, or a combination thereof.

The general principle of extracting and/or dissolving the contents of a closed capsule under pressure is known, and consists typically of inserting the capsule in the brewing cavity of a machine, injecting a quantity of pressurized water into the capsule, generally after piercing a face of the capsule with a piercing injection element such as a fluid injection needle which is associated to the brewing unit of the machine, so as to create a pressurized environment inside the capsule either to extract the substance or dissolve it, and then release the extracted substance or the dissolved substance through the capsule. When fluid is injected in the capsule compartment, a pressure is built up, which serves as an extraction means for extracting and/or dissolving ingredients contained inside the capsule. Such ingredients can be for instance a bed of roast and ground coffee. Alternatively or in combination with roast and ground coffee, the ingredients can comprise soluble ingredients, such as for instance beverage premixes. Capsules allowing the application of this principle are described for example in European patents no EP 1472156 B1, and EP 1784344 B1. By "pressurized" water, it is meant water (or an equivalent extraction fluid) which is pumped from a reservoir of the machine, i.e. at a pressure above ambient—which is generally equivalent to atmospheric—pressure. For beverage preparation, such as extraction of roast and ground coffee, dissolution of soluble ingredients (coffee, tea, chocolate, etc.), or infusion of infusible material such as tea leaves, the functional pressure is generally comprised between 1 and 20 bar (relative pressure to atmospheric pressure), preferably between 2 and 15 bar.

The machine base 2 comprises a fluid reservoir (not shown in the drawing)—in most cases this fluid is water—for storing the fluid that is used to dissolve and/or infuse and/or extract under pressure the ingredient(s) contained in the capsule. The reservoir is detachable and can be plugged in a reservoir port 4 that is built-in with the machine main base, as shown in FIG. 1.

The machine base 2 further comprises a heating element such as a boiler or a heat exchanger (not shown in FIG. 1), which is able to warm up the water used therein to working temperatures (classically temperatures up to 80-90° C.). Finally, the machine comprises a pump element for circulating the water from the tank to the capsule, optionally though the heating element. The way the water circulates within the machine is e.g. selected via a selecting valve means, such as for instance a peristaltic valve of the type described in European patent EP 2162653 B1.

The machine base 2 comprises fluid-conducting pipes for conducting the fluid from the reservoir to the brewing unit and the ingredient contained therein. The fluid-conducting pipes comprise connecting means, which serve to releasably assemble the brewing unit 3 to the base 2, through corresponding connecting means of the brewing unit 3.

The connection between the base 2 and the brewing unit 3 is a leak-tight fluid connection. It can also comprise data connection. The data connection between the base 2 and the brewing unit 3 can be performed by contact between the two (e.g. by electrical contact), or alternatively, it can be contactless (e.g. WIFI, RFID, GSM, Bluetooth, or equivalent contactless data transmission standards). The advantage of contactless connectivity between the machine base 2 and the brewing unit 3, is that the data transfer between the two is not impacted by the cleanliness of the physical elements of the system: in case one of several of the elements of the beverage system is dirty (e.g. spillage of liquid, water, ingredient, or product onto some parts of the machine base or the brewing unit), the quality of the data transmission between the two does not decrease, or is not stopped.

Figure 2:
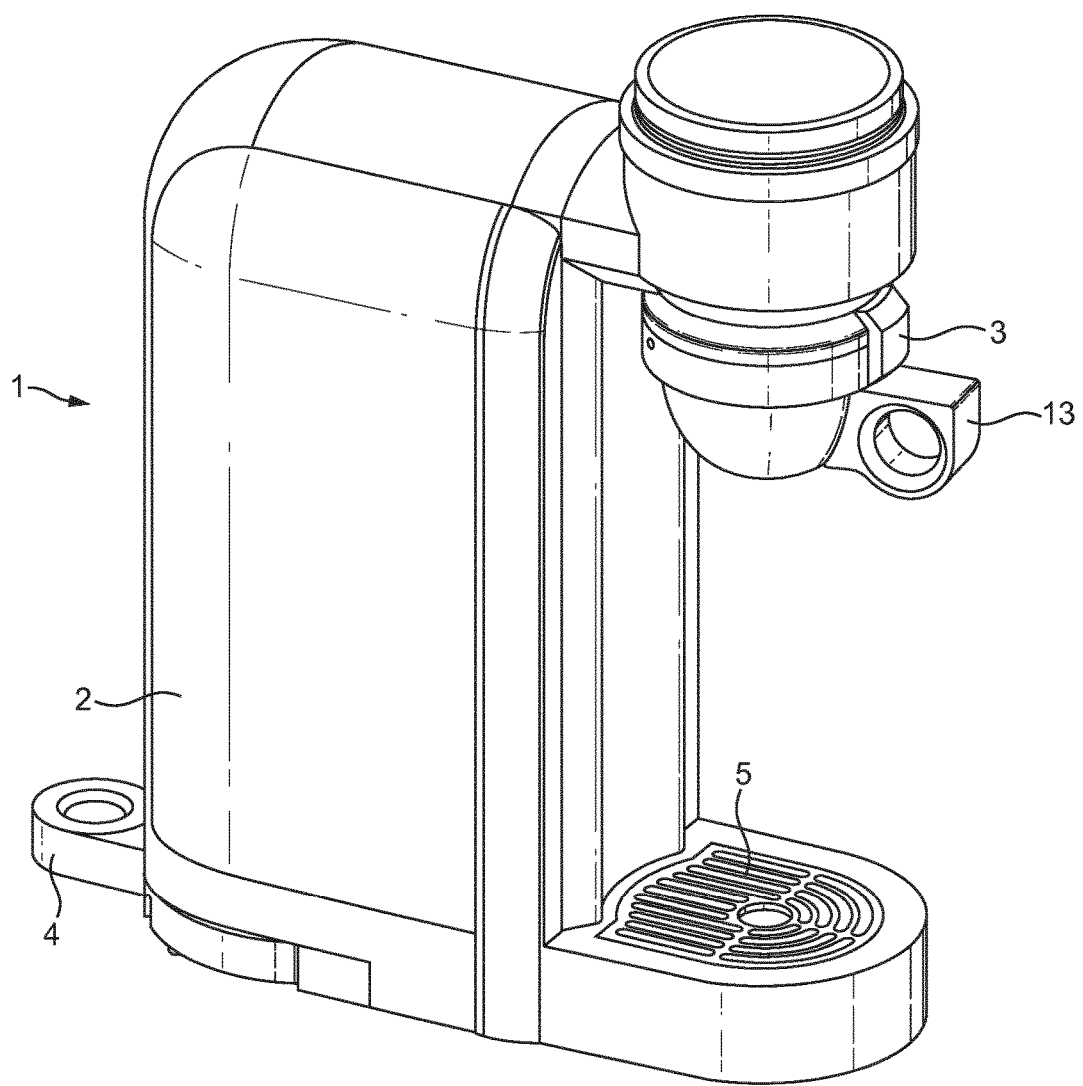
FIG. 2 is a view similar to FIG. 1, wherein the detachable brewing unit is attached to the main machine base.

The machine base 2 is constructed such that the connecting means between said base 2 and the detachable brewing unit 3 are easily accessible to the consumer, preferably in the front side of the machine, as illustrated in FIG. 1. The machine base 2 further comprises a cup holder 5, which is preferably movable so that it can adapt in height to different cup sizes. The cup holder 5 is placed below the brewing unit 3, as shown in FIGS. 1 or 2.

The connecting means of the brewing unit 3 comprise a cylindrical protrusion 6, that extends preferably vertically from the top surface of the brewing unit. The cylindrical protrusion 6 contains a central channel 8 that extends from the upper surface of the distal edge 7 of the protrusion 6, into the cavity of the brewing unit 3, and is therefore able to conduct the beverage preparation fluid from the machine base 2, towards the interior of the brewing unit, when the latter is functionally connected to the base 2.

Figure 4:
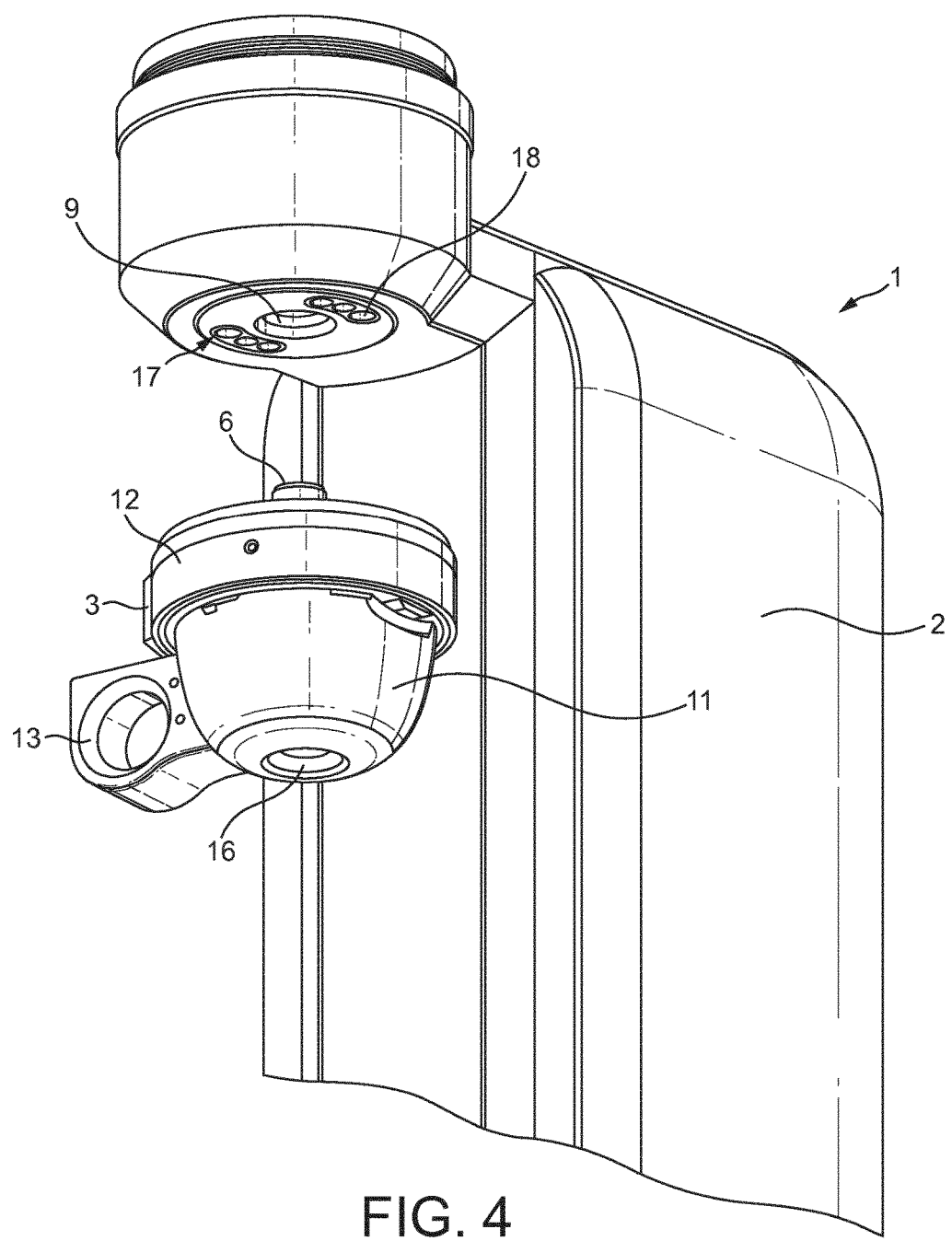
FIG. 4 is perspective bottom view similar to FIG. 1.

The cylindrical connecting protrusion 6 of the brewing unit is meant to mate with a corresponding fluid delivery port 9 of the machine base illustrated in FIG. 4, said port 9 being the distal end of the fluid conducting channel system that conducts the fluid contained in the reservoir through the machine base 2, towards the brewing unit. The inner diameter of the fluid delivery port 9 is such that when the brewing unit is connected functionally to the machine base, the connection protrusion 6 fits into said port in a leaktight but detachable manner.

Figure 3:
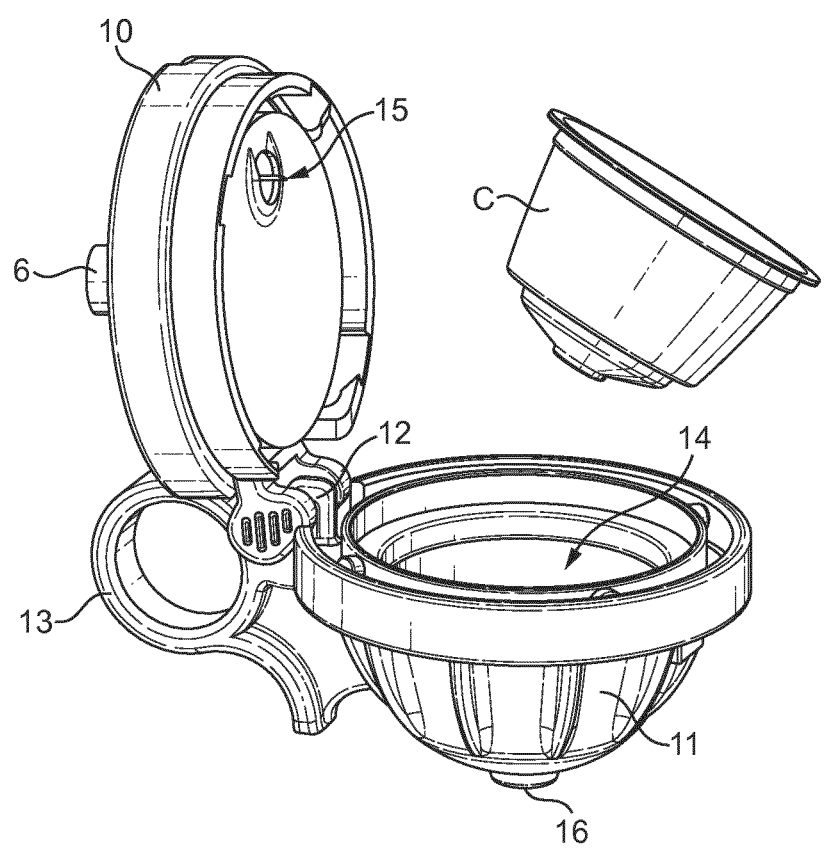
FIG. 3 is a schematic view of a detachable brewing unit in the open position with a beverage capsule being introduced thereinto.

As illustrated in FIG. 3, the brewing unit comprises two parts able to assemble to create a closed cavity for enclosing said ingredient contained in a capsule C, such that said brewing unit can inject fluid through said ingredient under pressure for mixing with said ingredient. More precisely in the embodiment illustrated in FIG. 3, the brewing unit 3 comprises an upper cavity part 10 and a lower cavity part 11. Both cavity parts 10 and 11 are hinged to one another via a pivot hinge 12. The lower cavity part 11 comprises a handle 13 for handling the brewing unit, in particular to facilitate insertion and removal into/from the machine base 2. The connecting means of the brewing unit—i.e. the protrusion 6 and the distal end 7—are part of the upper cavity part 10, and more particularly, the protrusion 6 extends upwardly from the upper surface of said upper part 10.

As illustrated in FIG. 3, the brewing unit 3 comprises a receptacle or cavity 14 for the capsule and a perforation and injection needle 15 made in the form of a hollow needle comprising in its distal region one or more liquid injection orifices. The needle has a dual function in that it opens the top portion of the capsule on the one hand, and that it forms the water inlet channel into the capsule on the other hand. More precisely, FIG. 3 shows the brewing unit in its open configuration, i.e. when its lower cavity part 11 and upper cavity part 10 are disassembled from one another by pivoting around the pivot hinge 12. By "disassembled" it is meant that lower and upper cavity part are partially split from one another, as illustrated in FIG. 3. In this open configuration of the brewing unit 3, an ingredient, or an ingredient capsule C as represented in FIG. 3 can be inserted inside the brewing unit cavity, or removed therefrom after usage. The capsule is inserted in a complementary hollow cup-shaped cavity 14 of the lower brewing part 11, such that an upper edge 16 of the capsule 14 rests upon a flange surrounding the cavity 14. The needle 15 is able to pierce through thin film material such as the top membrane of the capsule C so as to inject fluid thereinto.

When the brewing unit 3 is closed, the capsule C is sandwiched between the upper and lower cavity parts, so that a sealing is performed in this area and water circulating from the needle 19 towards the capsule, cannot escape from the space in between the capsule and the brewing unit, or outside of the brewing unit, i.e. the water flow is forced from the needle 15 through the interior of the capsule C where it produces a beverage, and then towards the dispensing side of the capsule and throughout the dispensing opening 16 of the brewing unit.

The brewing unit preferably comprises locking means for preventing disassembly of the cavity parts when fluid pressure within said cavity and/or said ingredient exceeds atmospheric pressure.

According to the principle of the invention, the machine base 2 and the detachable brewing unit 3 both have cooperating magnetic attachment means that create a detachable assembly between the two, and secure the assembly and the fluid connection between the two when the machine is functionally in order for brewing a beverage.

Figure 5:
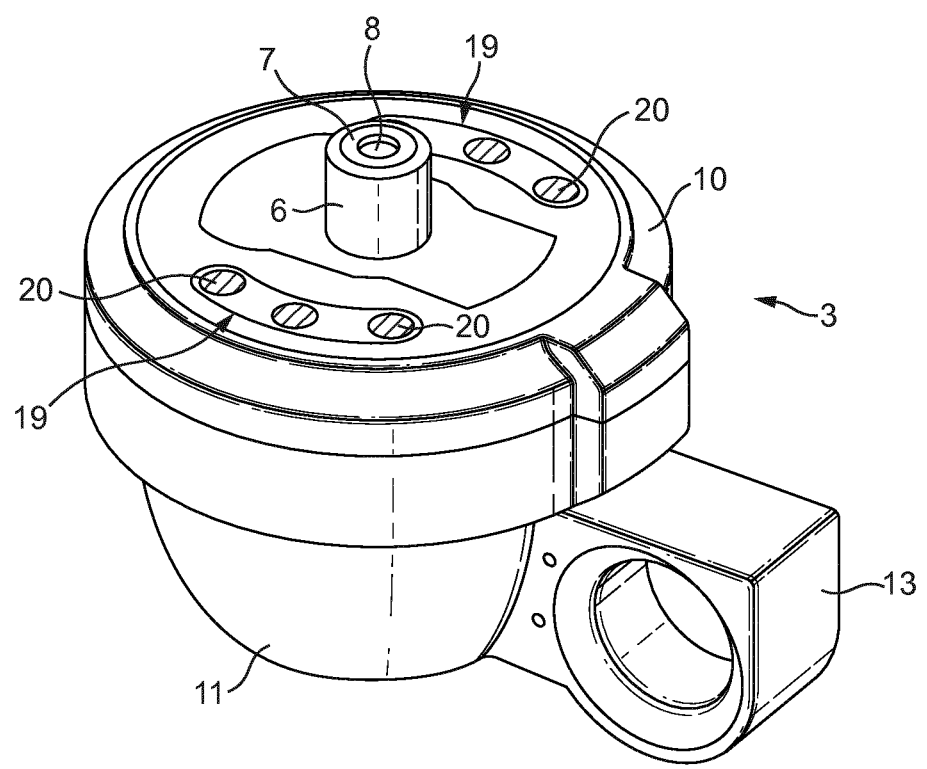
FIG. 5 is a view similar to FIG. 3, when the detachable brewing unit is in the closed position.

In a first embodiment of the invention illustrated in FIGS. 4 and 5, the cooperating magnetic attachment means comprise:

(i) two rows 17 of three magnets 18 on the upper wall surface of the machine base, the two rows located in diametrically opposed locations relative to the fluid delivery port 9 between the machine base 2 and the detachable brewing unit 3, as illustrated in FIG. 4, and (ii) two corresponding rows 19 of three magnets 20 on a wall of the detachable brewing unit 3, the two rows 19 located in diametrically opposed locations relative to the fluid connection protrusion 6 between the machine base 2 and said detachable brewing unit 3, as illustrated in FIG. 5.

In operation, each magnet 18 of the machine base 2 is aligned to a corresponding magnet 20 of the detachable brewing unit 3, when both are fluidly and functionally connected together. In the connected configuration, corresponding magnets in each alignment have opposite polarities so that they attract each other to keep the machine base and the detachable brewing unit secured one to another in a leaktight and fluid-connected assembly.

To release the detachable brewing unit 3 from the machine main base 2, the user rotates said brewing unit around the pivot point made by the fluid connection. Doing this, the connecting protrusion 6 rotates inside the fluid delivery port 9 of the base 2, until the magnets 20 of the brewing unit are in magnetic contact with the magnets 18 of the machine base that have the same polarity. Once magnets of same polarity start to be in alignment, the magnetic repulsion force tends to separate the base 2 and the brewing unit 3, and the disconnection is performed easily.

As it is easy to understand, the system according to the invention provides a very user-friendly and safe fluid connection between functional parts of the same beverage preparation machine: the same magnets are used to secure the fluid connection between the two functional elements of the machine, and at the same time, at least some of the same magnets are used to disconnect easily the two elements. The only way to easily disconnect the brewing unit from the base is by rotating it around the fluid connection.

Figure 6:
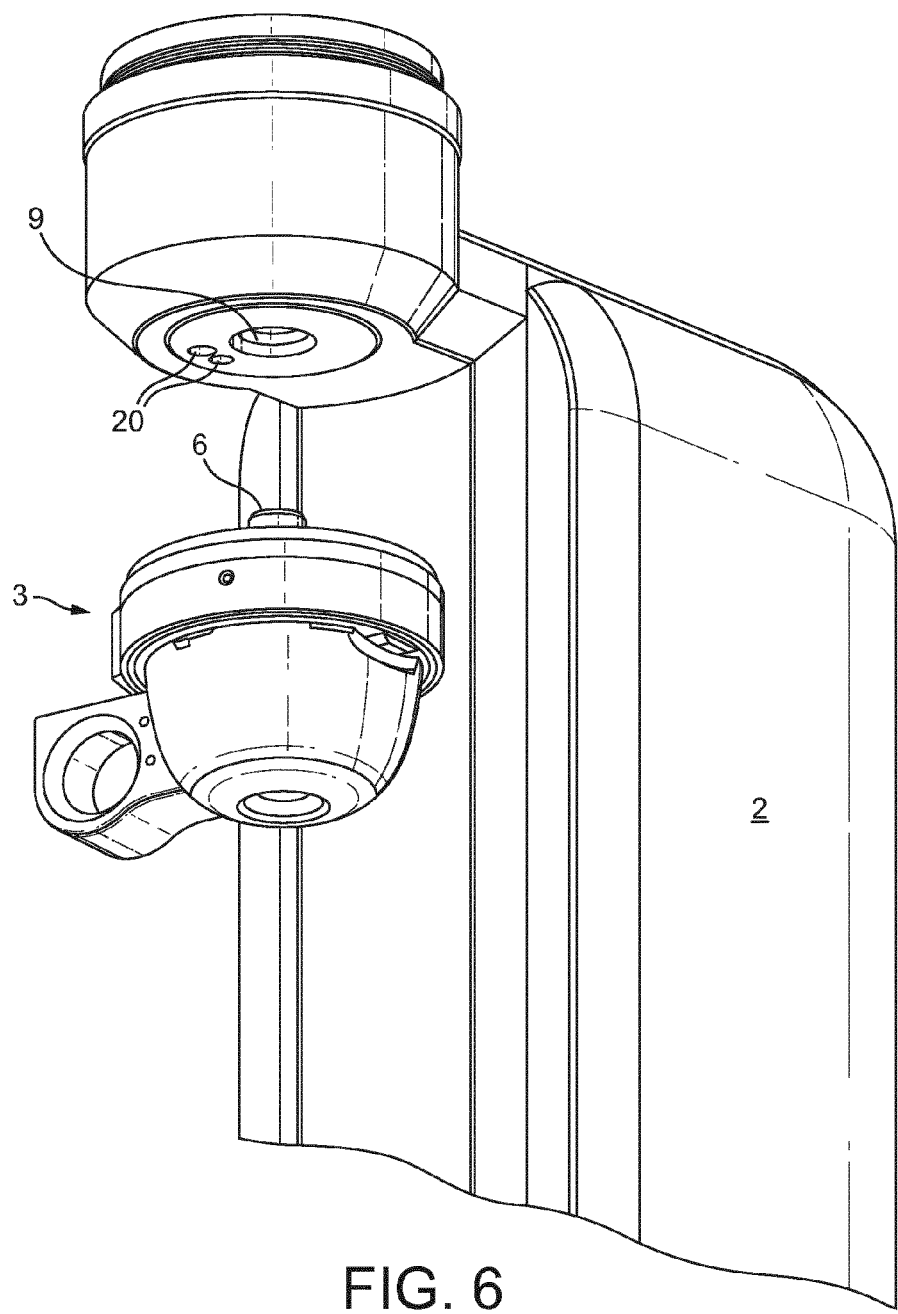
FIG. 6 is a view similar to FIG. 4 of an alternative embodiment of the invention.
Figure 7:
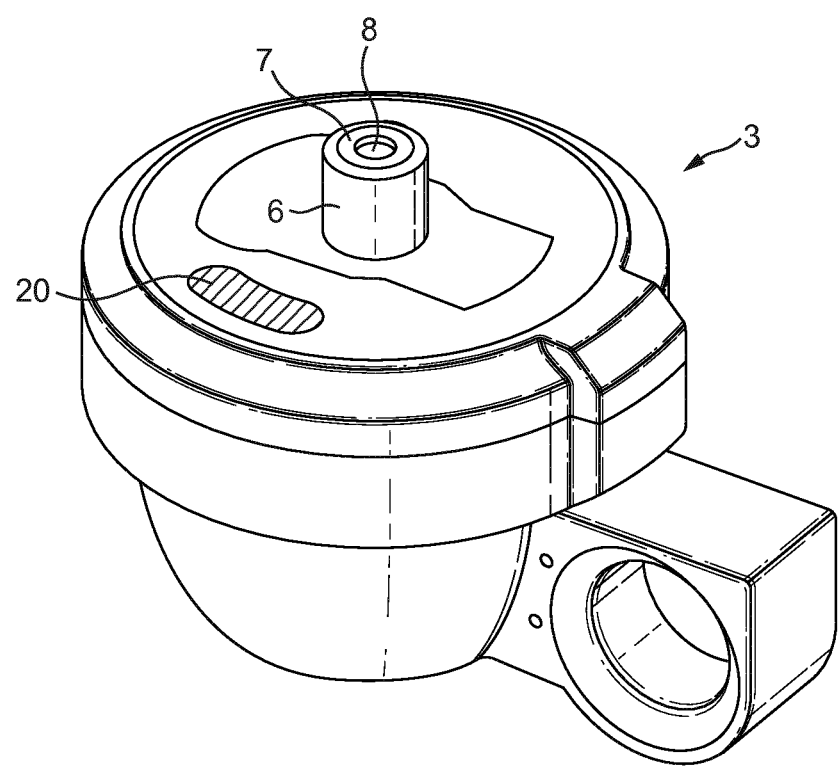
FIG. 7 is a view similar to FIG. 5 of an alternative embodiment of the invention.

In a second embodiment of the invention, illustrated in FIGS. 6 and 7, the functional principle of the beverage machine is similar as for the first embodiment, but the number of magnets is different. This second embodiment is a "lighter" and less expensive version of the invention, where the main machine base 2 comprises only two magnets 18 as shown in FIG. 6, which are used for magnetic attraction and repulsion with only one corresponding magnet 20 of the detachable brewing unit (illustrated in FIG. 7). To attach the brewing unit 3 to the base 2, the magnet 20 of the brewing unit is brought in magnetic contact with the magnet 18 of the base 2 having an opposite polarity. Then to detach the brewing unit from the base 2, the user rotates said brewing unit 3 to bring the magnet 20 in magnetic contact with the magnet 18 of the machine base having the same polarity.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A food or beverage preparation machine for preparing a flowable food product or a beverage by mixing a fluid with a precursor ingredient, the food or beverage preparation machine comprising:

a base having a fluid source, a pump suitable for conducting the fluid from the fluid source through fluid-conducting pipes to a fluid delivery port;

a detachable functional element detachable from the base, the functional element comprising a connector for connecting fluidly to the fluid delivery port of the base;

the base and the detachable functional element both having a cooperating magnetic releasable attachment member comprising:

at least one first permanent magnetic element attached to the detachable functional element or to the base, the at least one first magnetic element being located on a wall surface that also comprises either the connector or, respectively, the fluid delivery port, and at least two corresponding second magnetic elements either attached to the base or, respectively, attached to the detachable functional element, the at least two corresponding magnetic elements being located on a wall surface that also comprises either the fluid delivery port or, respectively, the connector, and one of the at least two corresponding second magnetic elements having a permanent opposite polarity to that of the at least one first magnetic element, such that:

when the detachable functional element is fluidly and functionally connected to the base, magnetic elements of the detachable functional element and the base in alignment have opposed polarities to be magnetically attracted, and then by rotating the detachable functional element relative to the base, the magnetic elements of the detachable functional element and the base are brought in a new alignment where two aligned magnetic elements have the same polarity, such that the detachable functional element is repelled outwardly from the base, and both are consequently disconnected from one another.

2. The food or beverage preparation machine according to claim 1, wherein the at least two corresponding second magnetic elements are permanent magnets.

3. The food or beverage preparation machine according to claim 1, wherein the detachable functional element is configured for mixing the fluid with the precursor ingredient and/or for dispensing the food or beverage to a serving container.

4. The food or beverage preparation machine according to claim 3, wherein the detachable functional element is a detachable brewing unit comprising a fluid injector and at least two cavity parts able to assemble to create a closed cavity for enclosing the precursor ingredient, such that the detachable brewing unit can inject the fluid through the precursor ingredient under pressure for mixing with the precursor ingredient.

5. The food or beverage preparation machine according to claim 4, wherein the detachable functional element is a brewing unit comprising a lock configured for preventing disassembly of the two cavity parts when fluid pressure within the closed cavity and/or the precursor ingredient exceeds atmospheric pressure.

6. The food or beverage preparation machine according to claim 3, wherein the detachable functional element is a drinking cup, and wherein the connector of the drinking cup has an integrated valve able to open when the drinking cup is fluidly connected to the base, and close in a leaktight manner when the drinking cup is detached from the base.

7. The food or beverage preparation machine according to claim 1, wherein the corresponding second magnetic element of the base and the corresponding second magnetic element of the detachable functional element are each placed at diametrically opposed locations relative to the fluid connection between the base and the detachable functional element.

8. The food or beverage preparation machine according to claim 1, wherein
the at least one first permanent magnetic element comprises two rows of three permanent magnets on the wall surface that comprises the fluid delivery port of the base, the two rows located in diametrically opposed locations relative to the fluid delivery port between the base and the detachable functional element, and
the at least two corresponding second magnetic elements comprises two corresponding rows of three permanent magnets on the wall surface that comprises the connector of the detachable functional element, the two corresponding rows located in diametrically opposed locations relative to a fluid connecting protrusion between the base and the detachable functional element,
such that each magnet of the base is aligned to a corresponding magnet of the detachable functional element when the detachable functional element is fluidly and functionally connected to the base, and magnets in each alignment have opposite polarities.

9. The food or beverage preparation machine according to claim 1 comprising a connection between the base and the detachable functional element is performed by insertion of a cylindrical channel that protrudes from the base or from the detachable functional element into a corresponding cylindrical recessed channel of either the detachable functional element or, respectively, a corresponding cylindrical recessed channel of the base, such that the base and the detachable functional element can be rotated around the connection.

10. The food or beverage preparation machine according to claim 1, wherein the precursor ingredient is enclosed in a portioned container.

11. The food or beverage preparation machine according to claim 1, wherein the fluid source is a fluid reservoir.

12. The food or beverage preparation machine according to claim 1, wherein the base further comprises an element configured for heating and/or chilling the fluid.

13. The food or beverage preparation machine according to claim 1, wherein the at least one first permanent magnetic element comprises one permanent magnet on the wall surface that comprises the connector of the detachable functional element, and the at least two corresponding second magnetic elements comprises two corresponding magnets on the wall surface that comprises the fluid delivery port of the base, one of the two corresponding magnets having a permanent opposite polarity to that of the one permanent first magnetic element, the other of the two corresponding magnets having the same polarity as that of the one permanent first magnetic element,
such that the one of the two corresponding magnets having a permanent opposite polarity to that of the one permanent first magnetic element is in alignment to the one permanent first magnetic element when the detachable functional element is fluidly and functionally connected to the base.

* * * * *